United States Patent
Sakata et al.

(10) Patent No.: US 12,442,344 B2
(45) Date of Patent: Oct. 14, 2025

(54) METHOD AND DEVICE FOR CONTROLLING STOPPING OF ENGINE

(71) Applicant: NISSAN MOTOR CO., LTD., Yokohama (JP)

(72) Inventors: Tomohiro Sakata, Kanagawa (JP); Seiji Hashimoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/849,752

(22) PCT Filed: Mar. 24, 2022

(86) PCT No.: PCT/JP2022/013770
§ 371 (c)(1),
(2) Date: Sep. 23, 2024

(87) PCT Pub. No.: WO2023/181224
PCT Pub. Date: Sep. 28, 2023

(65) Prior Publication Data
US 2025/0198359 A1    Jun. 19, 2025

(51) Int. Cl.
*F02D 41/24* (2006.01)
*F01N 3/20* (2006.01)

(52) U.S. Cl.
CPC ............... *F02D 41/24* (2013.01); *F01N 3/20* (2013.01)

(58) Field of Classification Search
CPC .................................. F02D 41/24; F01N 3/20
See application file for complete search history.

(56) References Cited

U.S. PATENT DOCUMENTS

| | | | |
|---|---|---|---|
| 2007/0006831 A1 | 1/2007 | Leone et al. | |
| 2007/0163531 A1* | 7/2007 | Lewis | F02D 41/042 123/90.11 |
| 2009/0095244 A1 | 4/2009 | Leone et al. | |
| 2013/0226439 A1* | 8/2013 | Hashemi | F02D 41/0295 701/112 |
| 2020/0049091 A1* | 2/2020 | Dai | F02D 41/1454 |

FOREIGN PATENT DOCUMENTS

| | | |
|---|---|---|
| JP | 2003-148201 A | 5/2003 |
| JP | 2007-016784 A | 1/2007 |
| JP | 2007-046488 A | 2/2007 |

* cited by examiner

*Primary Examiner* — Kevin A Lathers
(74) *Attorney, Agent, or Firm* — Foley & Lardner LLP

(57) ABSTRACT

In response to an engine temporary stop request, a quantity of oxygen stored in a catalytic converter is reduced by controlling an in-cylinder air fuel ratio to be richer than stoichiometric. The quantity of stored oxygen is calculated while the engine is operating. An amount of air fuel ratio enrichment is set based on the quantity of stored oxygen calculated when the stop request occurs, such that the amount of air fuel ratio enrichment decreases as the quantity of stored oxygen decreases. An opening of a throttle valve is reduced in response to the stop request. Engine stop is permitted when the reduction of the opening of the throttle valve causes an internal pressure of an intake passage downstream of the throttle valve to reach a predetermined negative pressure, and the air fuel ratio enrichment operation causes the quantity of stored oxygen to reach a predetermined target value.

5 Claims, 5 Drawing Sheets

METHOD AND DEVICE FOR CONTROLLING STOPPING OF ENGINE

TECHNICAL FIELD

The present invention relates to a control performed when an engine is stopped temporarily in response to a stop request.

BACKGROUND ART

In a vehicle equipped with an idle stop system, a so-called hybrid vehicle, etc., an engine is automatically stopped and automatically restarted. If a quantity of oxygen stored in a catalytic converter during a time period when the engine is stopped, i.e., the quantity of oxygen immediately before restart, is excessive, repetition of such automatic stop and automatic restart is likely to raise a problem of NOx emissions at restart. A patent document 1 discloses that, when an engine is temporarily stopped, a quantity of oxygen stored in a catalytic converter is reduced by enriching an air fuel ratio immediately before the engine is stopped.

However, according to this conventional technique, the enrichment is performed without taking into consideration the quantity of stored oxygen before the enrichment. This may cause the quantity of stored oxygen to be excessively reduced.

PRIOR ART DOCUMENT(S)

Patent Document(s)

Patent Document 1: Japanese Patent Application Publication No. 2003-148201

SUMMARY OF INVENTION

According to the present invention, a quantity of oxygen stored in a catalytic converter is calculated while an engine is operating, and an amount of enrichment for enrichment operation is set in accordance with a value of the quantity of stored oxygen calculated when a stop request is made, such that the amount of enrichment decreases as the value of the quantity of stored oxygen decreases.

This control serves to keep the quantity of stored oxygen within a suitable range, and thereby prevent the quantity of stored oxygen from being excessively reduced.

MODE(S) FOR CARRYING OUT INVENTION

The following describes an embodiment of the present invention. In this embodiment, the invention is applied to an engine 1 of a series hybrid vehicle as an example. As is well known, a series hybrid vehicle is composed of: a motor generator for electric power generation, which operates mainly as an electric generator; an engine 1 that drives the motor generator in response to a request for electric power; a motor generator for vehicle drive, which operates mainly as an electric motor to drive driving wheels; and a battery that temporarily stores a generated electric energy. Accordingly, the engine 1 repeats automatic stopping and automatic restarting relatively frequently in response to a request for electric power based on a state of charge (SOC) of the battery and others.

Figure 1:
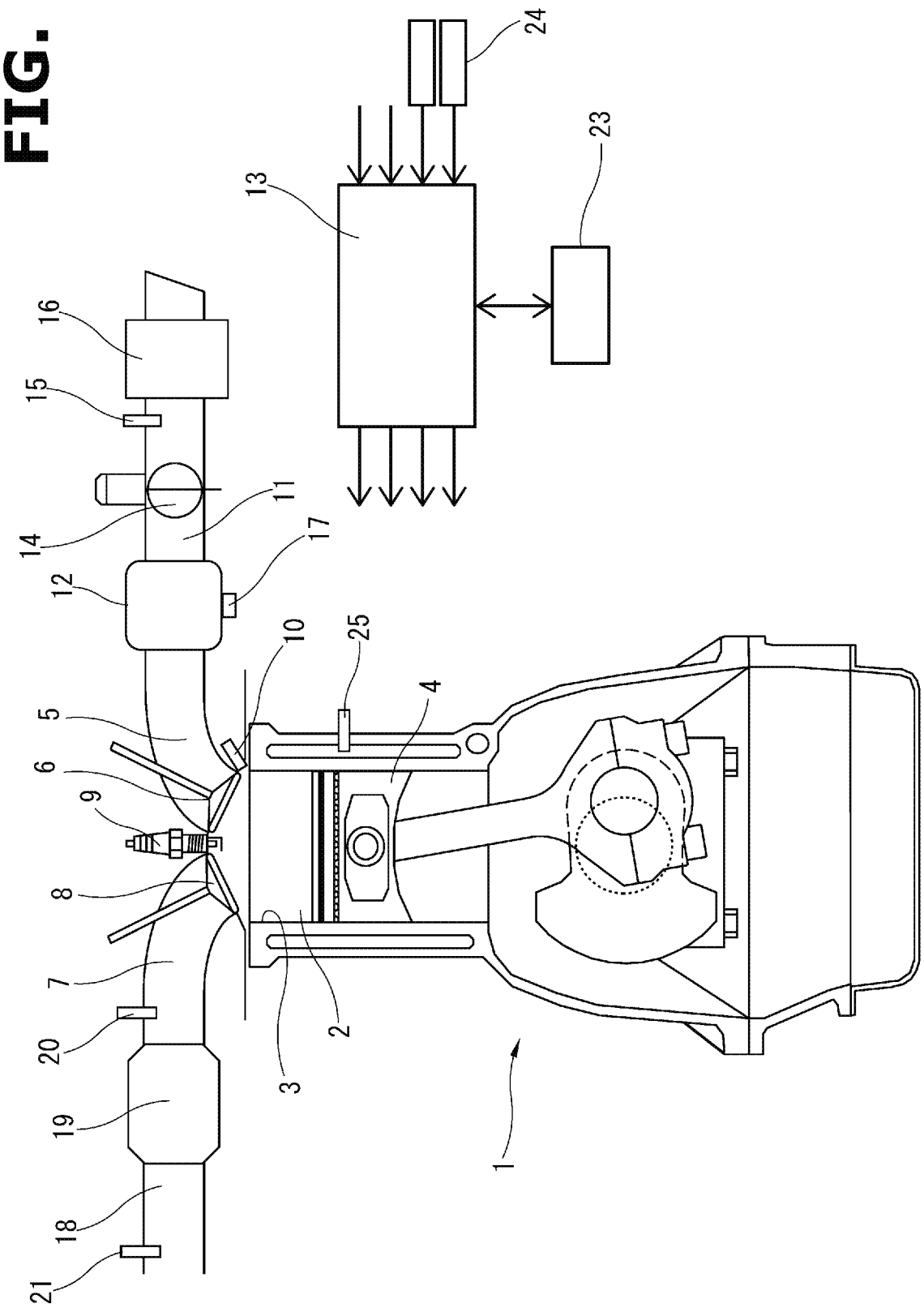
FIG. 1 is an explanatory diagram showing an engine to which the present invention is applied.

FIG. 1 shows a system configuration of the engine 1. In this example, the engine 1 is a four-stroke cycle spark ignition internal combustion engine. The engine 1 includes: a piston 4 that moves within a cylinder 3 to define a combustion chamber 2; an intake valve 6 that opens and closes between the combustion chamber 2 and an intake port 5; an exhaust valve 8 that opens and closes between the combustion chamber 2 and an exhaust port 7; an ignition plug 9 that performs ignition; and a fuel injection valve 10 that injects fuel into the cylinder 3, etc. The fuel injection valve 10 is an electromagnetic or piezoelectric injection valve that opens when a drive pulse signal is applied thereto. The fuel injection valve 10 injects a quantity of fuel that is substantially proportional to the pulse width of the drive pulse signal. The present invention may be implemented by a port injection type in which the intake port 5 is provided with a fuel injection valve.

An electronically controlled throttle valve 14, which has an opening controlled in accordance with a control signal from an engine controller 13, is disposed upstream of a collector section 12 of an intake passage 11 connected to the intake port 5. An air flow meter 15 is disposed upstream of the throttle valve 14 for sensing a quantity of intake air. An air cleaner 16 is disposed upstream of the airflow meter 15. The collector section 12 is provided with an intake pressure sensor 17 that senses an intake pressure downstream of the throttle valve 14.

Furthermore, the exhaust port 7 is connected to an exhaust passage 18. The exhaust passage 18 is provided with a catalytic converter 19 composed of a three-way catalyst. An upstream air fuel ratio sensor 20 and a downstream air fuel ratio sensor 21 are disposed upstream and downstream of the catalytic converter 19, respectively, for sensing an oxygen concentration in exhaust gas, i.e., for sensing a so-called exhaust air fuel ratio. The air fuel ratio sensor is capable of sensing the air fuel ratio over a wide range, but may be replaced with an $O_2$ sensor.

The engine 1 is controlled by the engine controller 13. The engine controller 13 and a vehicle controller 23 are connected to each other via an in-vehicle network, and configured to transmit and receive signals to and from each other. When the engine controller 13 receives a start request from the vehicle controller 23 in accordance with the accelerator pedal opening and vehicle speed of the vehicle, the SOC of the battery, and others, the engine controller 13 causes the engine 1 to be started. Thereafter, when the engine controller 13 receives a stop request from the vehicle controller 23, the engine controller 13 causes the engine 1 to be stopped. The engine 1 is activated also in response to other requests such as a request for heating. The vehicle controller 23 and the engine controller 13 may be integrated into a single controller.

The engine controller 13 receives input of sensing signals from sensors and others, wherein the sensors include the air flow meter 15, the intake pressure sensor 17, and the air fuel ratio sensors 20, 21, and also a crank angle sensor 24 for sensing the engine speed, and a water temperature sensor 25 for sensing a coolant temperature. Furthermore, the engine controller 13 receives input of a vehicle speed signal, an accelerator pedal opening signal, and others from the vehicle controller 23. Based on these input signals, the engine controller 13 optimally controls the quantity and timing of fuel injection by the fuel injection valve 10, the ignition timing by the spark plug 9, the opening of the throttle valve 14, and others.

Figure 2:
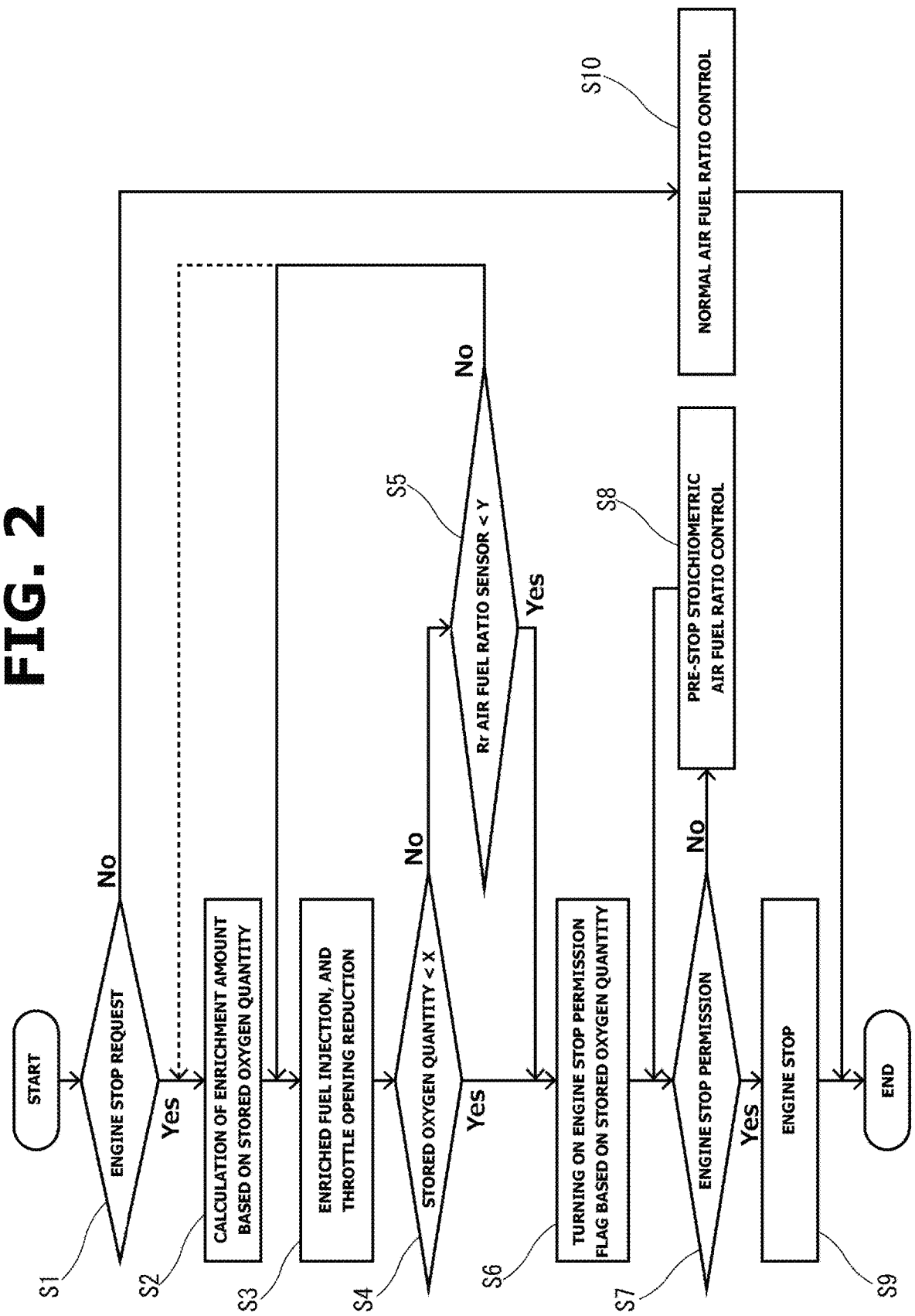
FIG. 2 is a flowchart showing a control performed when an engine is temporarily stopped.

The following describes a control performed when the engine 1 is temporarily stopped, with reference to a flowchart shown in FIG. 2. When the engine 1 is stopped, a so-called no-load run period occurs from an event of ignition stop to an event of actual stop of rotation of a crankshaft, wherein air passes through the catalytic converter 19 during the no-load run period. This increases a quantity of oxygen stored in the catalyst of the catalytic converter 19, so that the quantity of stored oxygen becomes excessively large immediately before restart. In order to solve this problem, this embodiment is configured to enrich an in-cylinder air fuel ratio and thereby reduce the quantity of stored oxygen, before stop of the engine 1.

The flowchart of FIG. 2 shows an example of a process, which is repeatedly executed while the engine 1 is in operation. First, at Step 1, it is determined whether or not an engine stop request is present. When an engine stop request is present, the process proceeds to Step 2 and onward. When no engine stop request is present, the process proceeds to Step 10 where a normal air fuel ratio control is performed. The normal air fuel ratio control is implemented by controlling the fuel injection quantity using a publicly known air fuel ratio control method so as to maintain the air fuel ratio as stoichiometric and further maintain the quantity of stored oxygen within a predetermined range. The control of the quantity of stored oxygen within the predetermined range during normal operation serves to make it easier to control the quantity of stored oxygen in response to stop and restart.

Figure 3:
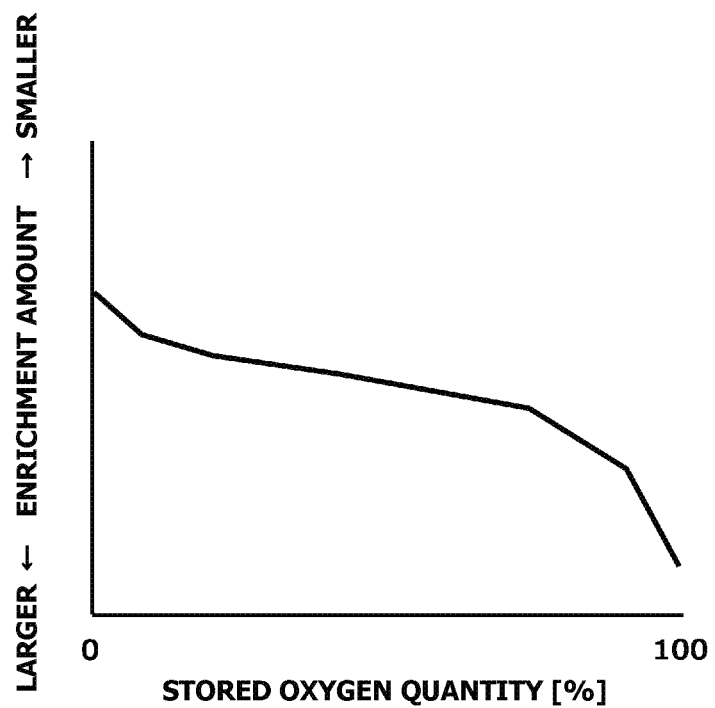
FIG. 3 is a characteristic diagram showing characteristics of an enrichment amount with respect to a stored oxygen quantity.

At Step 2, a required enrichment amount is calculated in accordance with the quantity of oxygen stored at the moment. In this example, as shown in a characteristic diagram shown in FIG. 3, the required enrichment amount is calculated such that as the stored oxygen quantity increases (closer to 100%), the enrichment amount increases, and as the stored oxygen quantity decreases (closer to 0%), the enrichment amount decreases. The stored oxygen quantity is repeatedly calculated by another routine not shown while a main switch of the vehicle is ON. For example, the stored oxygen quantity is constantly estimated by accumulating an increase or decrease in stored oxygen per unit time or unit cycle, based on the exhaust air fuel ratio of exhaust gas flowing into the catalytic converter 19 sensed by the upstream air fuel ratio sensor 20, and the volume of exhaust gas passing through the catalytic converter 19. In this way, at Step 2, the enrichment amount is determined in accordance with the stored oxygen quantity at the moment when the stop request is made.

After the enrichment amount is determined, the process proceeds to Step 3 where enriched fuel is injected. This may be implemented by increasing the quantity of fuel injected at a normal injection timing, or may be implemented by providing an additional fuel injection at a timing different from the normal injection timing. Simultaneously, the engine load is reduced, namely, the opening of the throttle valve 14 is reduced. This is an operation detailed below, which is intended for reducing the air flow rate (the rate of gas flow passing through the catalytic converter 19) during the no-load running period. The opening of the throttle valve 14 is reduced in advance, because there is a delay in change in the quantity of air.

Next, the process proceeds to Step 4 where it is determined whether or not the stored oxygen quantity, which is continuously calculated in the other routine not shown, has fallen below a predetermined target threshold value (X). In case of YES, the process proceeds to Step 6. In case of NO, the process proceeds to Step 5 where it is determined whether or not the exhaust air fuel ratio indicated by the downstream air fuel ratio sensor 21 is less than a predetermined threshold value (Y). The threshold value (Y) for the downstream air fuel ratio sensor 21 is set so as to correspond to a target stored oxygen quantity. In case of YES at Step 5, the process proceeds to Step 6 as well. In this way, it is determined at Step 4 based on the stored oxygen quantity, which is an accumulated value, whether or not the stored oxygen quantity has reached the target value, and it is determined at Step 5 based on the composition of the gas that has passed through the catalytic converter 19 whether or not the stored oxygen quantity has reached the target value. By estimating the stored oxygen quantity using the sensed value of the downstream air fuel ratio sensor 21 at Step 5, it is possible to estimate the stored oxygen quantity with a high accuracy.

When the answer is NO in both Steps 4 and 5, the process returns to Step 3 where the injection of enriched fuel is repeated. Then, the determinations at Steps 4 and 5 are performed in the same manner. In other words, the enrichment is continued until the answer to Step 4 or Step 5 becomes YES.

At Step 6, an engine stop permission flag, which is a permission flag for engine stop in view of the stored oxygen quantity, is set ON. Even when the engine stop permission flag based on the stored oxygen quantity is turned ON, engine stop is not permitted unless several engine stop permission flags based on other requirements are turned ON simultaneously. Next, at Step 7, it is determined whether or not engine stop is permitted, taking into account such other requirements. When engine stop is permitted, the process proceeds to Step 9 where the engine 1 is stopped, namely, fuel injection and ignition of the engine 1 are stopped.

In case of NO at Step 7, namely, when the engine stop permission flag based on the viewpoint of the stored oxygen quantity is ON but engine stop is not permitted based on the other requirements, the process proceeds to Step 8 where a pre-stop stoichiometric air fuel ratio control is performed to maintain the in-cylinder air fuel ratio at the stoichiometric point. This causes the stored oxygen quantity to be maintained unchanged basically. This pre-stop stoichiometric air fuel ratio control is continued until it is determined at Step 7 that engine stop is permitted.

The condition for turning on the engine stop permission flag based on the viewpoint of the stored oxygen quantity at Step 6 may be implemented by a combination of the determinations at Steps 4 and 5 and an additional condition that the intake pressure sensed by the intake pressure sensor 17 has reached a predetermined negative pressure. In this case, when the stored oxygen quantity reaches the target value and the intake pressure becomes the predetermined negative pressure, the engine stop permission flag based on the viewpoint of the stored oxygen quantity is turned ON.

Figure 4:
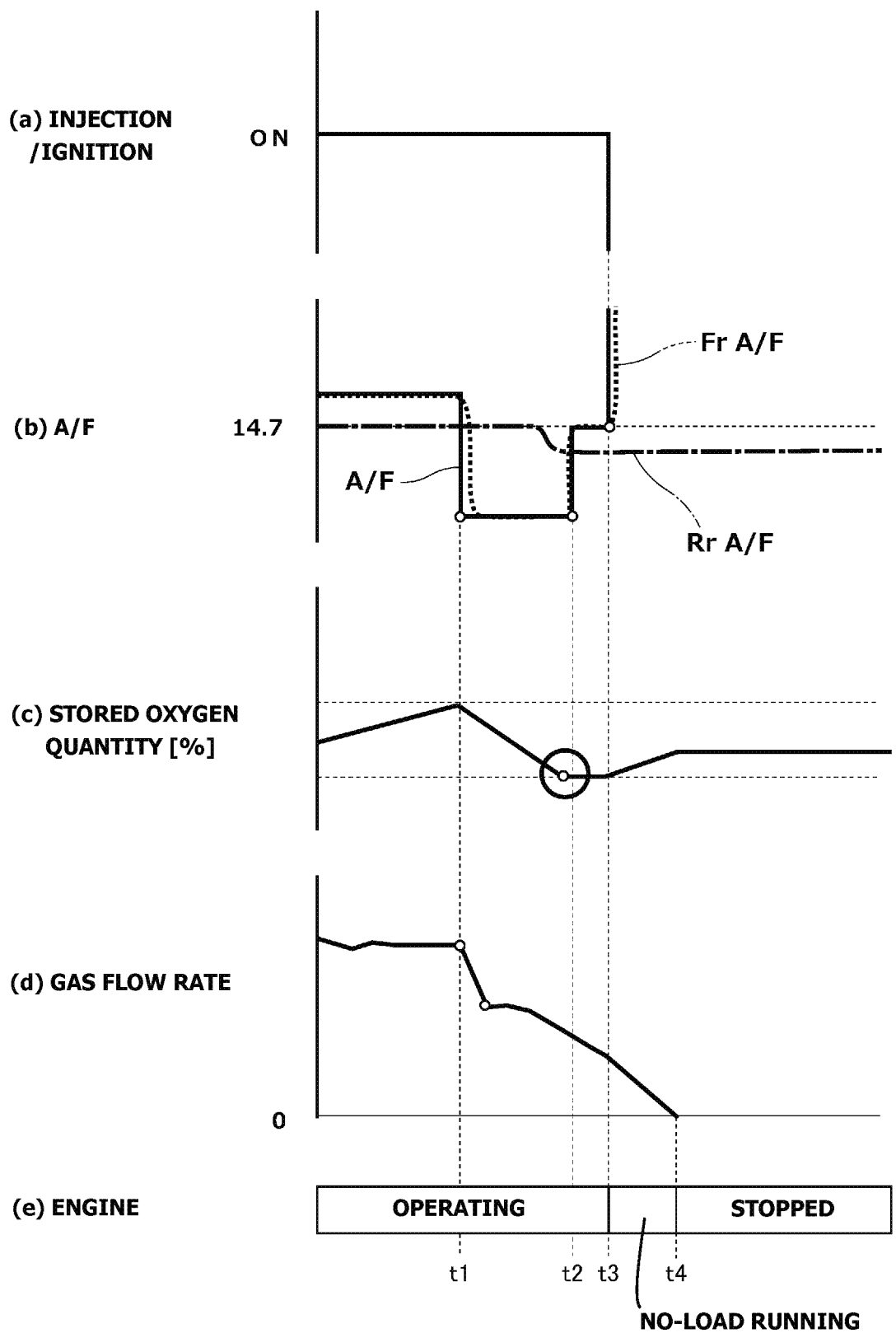
FIG. 4 is a time chart for a situation of a temporary stop according to an embodiment.

FIG. 4 is a time chart showing changes in the stored oxygen quantity and others when the engine is stopped under the control described above. At the top, the row (a) about injection/ignition shows a flag indicating whether injection and ignition (in other words, operation of the engine 1) are performed or stopped. The row (b) about air fuel ratio shows three quantities: the air fuel ratio in the cylinder (actually, the target air fuel ratio for the injection quantity control) (labeled with "A/F"); the exhaust air fuel ratio on the inlet side of the catalytic converter sensed by the upstream air fuel ratio sensor 20 (labeled with "Fr A/F"); and the exhaust air fuel ratio on the outlet side of the catalytic converter sensed by the downstream air fuel ratio sensor 21 (labeled with "Rr A/F"). The row (c) about stored oxygen quantity shows changes in the stored oxygen quantity in the catalyst of the catalytic converter 19. A circle marked with a symbol OS indicates the target quantity of stored oxygen. The next row (d) about gas flow rate indicates the rate of the gas flow passing through the catalytic converter 19.

Moreover, at the bottom of FIG. 4, the row (e) shows a state of the engine 1. The state is categorized into "OPERATING", "NO-LOAD RUNNING" and "STOPPED". "OPERATING" refers to a state in which the engine 1 is rotating with combustion caused by fuel injection and ignition. "NO-LOAD RUNNING" refers to a state in which the crankshaft continues to rotate due to inertia an others after stop of fuel injection and ignition. "STOPPED" means that rotation of the crankshaft is stopped.

In the example of FIG. 4: at a time instant t1, an engine stop request is outputted from the vehicle controller 23 to the engine controller 13; at a time instant t2, the engine stop permission flag based on the viewpoint of the stored oxygen quantity is turned ON; at a time instant t3, engine stop is finally permitted; and at a time instant t4, rotation of the engine 1 stops.

By the time instant t1, the normal air fuel ratio control is performed. The exhaust air fuel ratio on the catalytic converter inlet side, Fr A/F, basically changes following the in-cylinder air fuel ratio. In this example, until the time instant t1, the air fuel ratio A/F is controlled to be slightly leaner than the stoichiometric air fuel ratio, in order to maintain the exhaust air fuel ratio within the predetermined range. The exhaust air fuel ratio on the catalytic converter outlet side, Rr A/F, changes slowly due to the oxygen storage capacity of the catalytic converter.

When an engine stop request is outputted at the time instant t1, the air fuel ratio A/F is enriched, and simultaneously, the opening of the throttle valve 14 is reduced. As the opening of the throttle valve 14 decreases, the flow rate of gas passing through the catalytic converter 19 decreases.

As the air fuel ratio A/F becomes richer, the stored oxygen quantity in the catalytic converter gradually decreases. Then, at the time instant t2, the target stored oxygen quantity is reached. As a result, the engine stop permission flag based on the viewpoint of the stored oxygen quantity is turned ON, and the enrichment operation is terminated, and shifted to operation at the stoichiometric air fuel ratio. In the above embodiment, the enrichment amount is set in accordance with the stored oxygen quantity at the time instant t1. Therefore, for example, when the stored oxygen quantity at the time instant t1 is small, there is no excessively rapid decrease in the stored oxygen quantity, namely, the stored oxygen quantity does not cause a so-called overshoot and does not decrease too much. Conversely, when the stored oxygen quantity at the time instant t1 is relatively high, a rapid decrease in the stored oxygen quantity is achieved by an appropriate enrichment amount.

Thereafter, at the time instant t3, the engine is permitted to stop, and fuel injection and ignition are stopped. Thereafter, the engine runs idle without any combustion, and only air passes through the catalytic converter 19. Accordingly, the stored oxygen quantity increases. At this moment, in the above embodiment, the opening of the throttle valve 14 is reduced in advance, so that the quantity of air flowing into the catalytic converter 19 during no-load running is restricted to be small. This serves to minimize an undesirable increase in the stored oxygen quantity caused by the no-load running.

Figure 5:
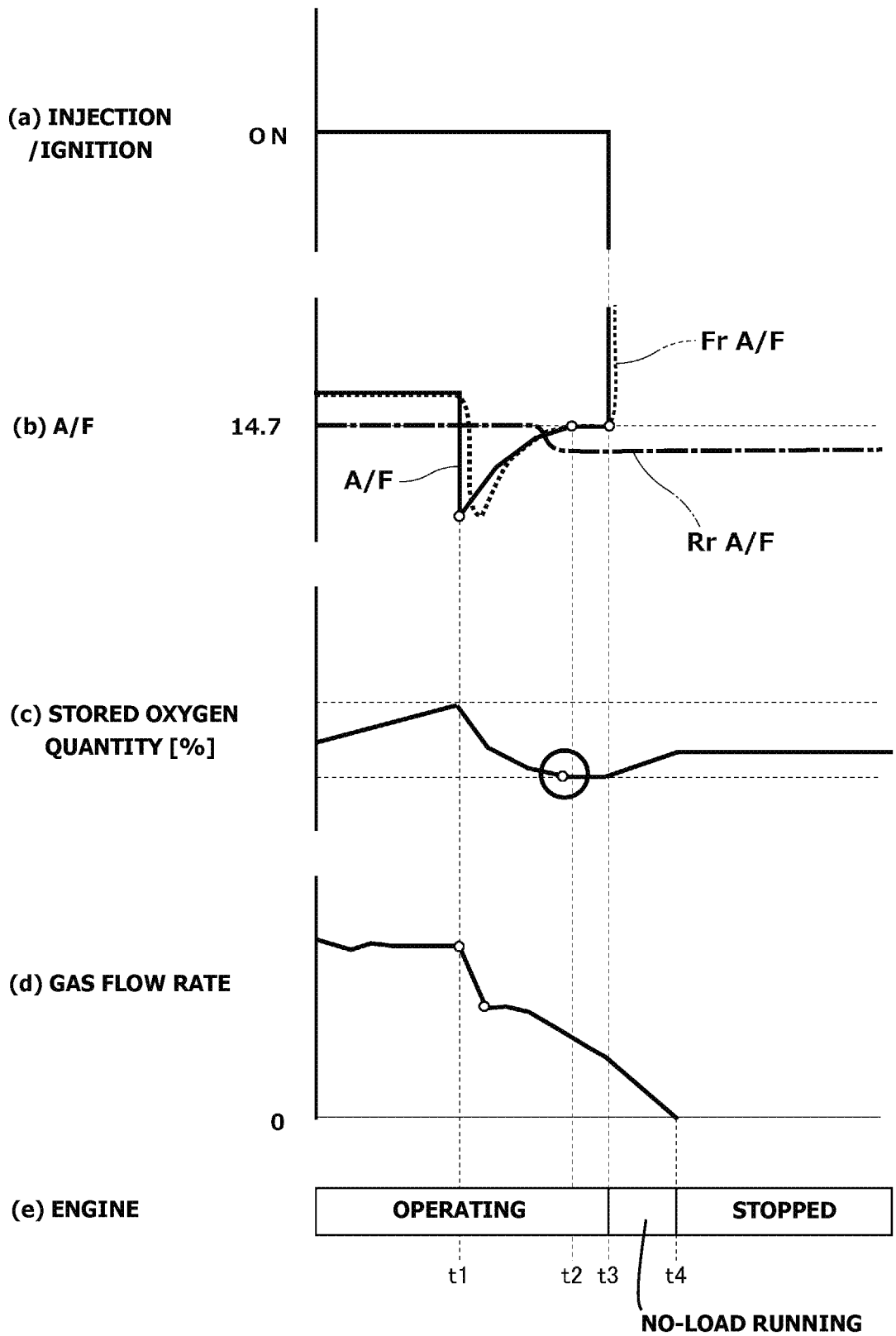
FIG. 5 is a time chart for a situation of a temporary stop according to another embodiment.

Next, FIG. 5 shows a time chart according to another embodiment. In this embodiment, as shown by a dashed line in the flow chart of FIG. 3, in case of NO at Steps 4 and 5, the process returns to Step 2 where the calculation of the enrichment amount is repeatedly performed in accordance with the stored oxygen quantity at the moment. At Step 2, the enrichment amount is initially determined in accordance with the stored oxygen quantity at the time when the stop request is made, and thereafter, the enrichment amount is set in accordance with the stored oxygen quantity at the moment.

Accordingly, as shown in rows (b) and (c) of FIG. 5, as the stored oxygen quantity decreases due to the enrichment operation, the enrichment amount gradually decreases. This serves to suppress the stored oxygen quantity from overshooting to become smaller than the target value. Furthermore, when the air fuel ratio shifts to the stoichiometric point at the end of the enrichment operation (at the time instant t2), the air fuel ratio changes with a smaller step.

Although one embodiment of the present invention has been described above, the present invention is not limited to the above embodiment and various modifications are possible. For example, the present invention is not limited to the engine 1 of the series hybrid vehicle, but may be applied to any engine that performs a temporary automatic stop. In the above embodiment, two different methods of Step 4 and Step 5 are performed to determine whether or not the stored oxygen quantity has reached the target value, but it is also possible to use only one of the methods of Steps 4 and 5.

The invention claimed is:

1. An engine stop control method comprising:
   stopping an engine temporarily in response to a stop request for stopping the engine temporarily;
   reducing a quantity of oxygen stored in a catalytic converter by an air fuel ratio enrichment operation of controlling an in-cylinder air fuel ratio to be richer than stoichiometric, in response to the stop request;
   calculating the quantity of stored oxygen while the engine is operating;
   setting an amount of air fuel ratio enrichment for the air fuel ratio enrichment operation, in accordance with a value of the quantity of stored oxygen calculated when the stop request occurs, such that the amount of air fuel ratio enrichment decreases as the value of the quantity of stored oxygen decreases;
   reducing an opening of a throttle valve disposed in an intake passage, in response to the stop request; and
   permitting the engine to be stopped, in response to a condition that the reduction of the opening of the throttle valve causes an internal pressure of a section of the intake passage downstream of the throttle valve to reach a predetermined negative pressure, and the air fuel ratio enrichment operation causes the quantity of oxygen stored in the catalytic converter to reach a predetermined target value.

2. The engine stop control method as claimed in claim 1, comprising controlling the quantity of stored oxygen to be within a predetermined range, while the engine is operating.

3. The engine stop control method as claimed in claim 1, comprising controlling the in-cylinder air fuel ratio to be stoichiometric, in response to a condition that the quantity of oxygen stored in the catalytic converter reaches a target value before the engine is stopped.

4. The engine stop control method as claimed in claim 1, comprising determining, based on a sensed value of an oxygen concentration sensor disposed downstream of the catalytic converter, whether or not the quantity of oxygen stored in the catalytic converter reaches a target value.

5. An engine stop control device comprising a controller configured to:
  stop an engine temporarily in response to a stop request for stopping the engine temporarily;
  reduce a quantity of oxygen stored in a catalytic converter by an air fuel ratio enrichment operation of controlling an in-cylinder air fuel ratio to be richer than stoichiometric, in response to the stop request;
  calculate the quantity of stored oxygen while the engine is operating;
  set an amount of air fuel ratio enrichment for the air fuel ratio enrichment operation, in accordance with a value of the quantity of stored oxygen calculated when the stop request occurs, such that the amount of air fuel ratio enrichment decreases as the value of the quantity of stored oxygen decreases;
  reduce an opening of a throttle valve disposed in an intake passage, in response to the stop request; and
  permit the engine to be stopped, in response to a condition that the reduction of the opening of the throttle valve causes an internal pressure of a section of the intake passage downstream of the throttle valve to reach a predetermined negative pressure, and the air fuel ratio enrichment operation causes the quantity of oxygen stored in the catalytic converter to reach a predetermined target value.

\* \* \* \* \*